United States Patent
Avni et al.

(10) Patent No.: US 9,743,043 B2
(45) Date of Patent: *Aug. 22, 2017

(54) METHOD AND SYSTEM FOR HANDLING CONTENT IN VIDEOCONFERENCING

(71) Applicant: Polycom, Inc., San Jose, CA (US)

(72) Inventors: Uri Avni, Moshav Ram-on (IL); Alon Klein, Herzeliya (IL); Danny Shnaps, Nof Ayalon (IL); Yoella Bourshan, Maccabim-Reut (IL); Eyal Leviav, Tel-Aviv (IL); Noa Reiter, Rehovot (IL)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/181,132

(22) Filed: Jun. 13, 2016

(65) Prior Publication Data

US 2016/0373697 A1 Dec. 22, 2016

Related U.S. Application Data

(63) Continuation of application No. 14/174,218, filed on Feb. 6, 2014, now Pat. No. 9,369,671.

(60) Provisional application No. 61/763,331, filed on Feb. 11, 2013.

(51) Int. Cl.
*H04N 7/14* (2006.01)
*H04N 7/15* (2006.01)
*H04L 29/06* (2006.01)

(52) U.S. Cl.
CPC ............ *H04N 7/152* (2013.01); *H04L 65/403* (2013.01); *H04L 65/605* (2013.01); *H04N 7/147* (2013.01)

(58) Field of Classification Search
CPC ... G01S 5/0072; H04L 65/403; H04L 65/605; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04W 4/18; H04W 4/185
USPC ......... 348/14.01, 14.02, 14.03, 14.04, 14.05, 348/14.06, 14.07, 14.08, 14.09, 14.1, 348/14.11, 14.12, 14.13, 14.14, 15.15,
(Continued)

(56) References Cited

U.S. PATENT DOCUMENTS 6,300,973 B1 * 10/2001 Feder .................... H04N 7/152
348/14.09
7,174,365 B1 * 2/2007 Even ..................... H04M 3/367
348/14.08

(Continued)

*Primary Examiner* — Khai N Nguyen
(74) *Attorney, Agent, or Firm* — Blank Rome, LLP

(57) ABSTRACT

A technique allows delivering content in a videoconference among a plurality of conferees in multiple quality levels. Content distributed from a multipoint control unit that is connected to an endpoint that delivers the content to receiving endpoints may have two or more quality levels. The quality level can be adapted to the capabilities of the receiving endpoints and the current quality of the connection that is used to deliver the content toward the receiving endpoints. The quality level associated with an endpoint may change during a session dynamically, adapting the delivery mode to changes in the condition of the connection between the receiving endpoints and the multipoint control unit.

20 Claims, 3 Drawing Sheets

(58) Field of Classification Search
USPC ....... 348/14.16; 379/265.03; 455/414.1, 566; 704/270
See application file for complete search history.

(56) References Cited

U.S. PATENT DOCUMENTS

| | | | | |
|---|---|---|---|---|
| 7,535,485 B2* | 5/2009 | Elbaz | ................... | H04N 7/148 348/14.08 |
| 8,896,652 B2* | 11/2014 | Ralston | ............... | H04L 12/1827 348/14.02 |
| 2005/0157164 A1* | 7/2005 | Eshkoli | ................. | H04N 7/152 348/14.07 |
| 2007/0050448 A1* | 3/2007 | Gonen | ................... | H04N 7/152 709/204 |
| 2007/0061398 A1* | 3/2007 | Forssell | ............. | H04L 12/1827 709/204 |
| 2007/0081075 A1* | 4/2007 | Canova | ................ | H04M 3/567 348/14.08 |
| 2011/0018960 A1* | 1/2011 | Eshkoli | ............... | H04L 12/1822 348/14.09 |
| 2011/0196972 A1* | 8/2011 | Farmer | ................ | H04L 12/1822 709/228 |
| 2011/0252082 A1* | 10/2011 | Cobb | .................... | H04L 65/605 709/203 |
| 2011/0252090 A1* | 10/2011 | Garcia, Jr. | .......... | H04L 12/1827 709/204 |
| 2011/0310216 A1* | 12/2011 | Lee | .......................... | H04N 7/15 348/14.08 |
| 2012/0140020 A1* | 6/2012 | Rosenberg | ............. | H04N 7/147 348/14.07 |
| 2012/0236106 A1* | 9/2012 | Wu | ........................ | H04M 3/567 348/14.07 |
| 2013/0057639 A1* | 3/2013 | Ralston | ............... | H04L 12/1827 348/14.02 |
| 2014/0132701 A1* | 5/2014 | Wang | ..................... | G06F 17/289 348/14.08 |
| 2014/0219088 A1* | 8/2014 | Oyman | ............ | H04N 21/23439 370/231 |
| 2014/0313989 A1* | 10/2014 | Doken | ................. | H04L 65/605 370/329 |

* cited by examiner

METHOD AND SYSTEM FOR HANDLING CONTENT IN VIDEOCONFERENCING

TECHNICAL FIELD

The present invention relates to video communication and more particularly to the field of multipoint video conferencing associated with content.

BACKGROUND ART

As traffic over Internet Protocol (IP) networks continues its rapid growth, with the growth of the variety of multimedia conferencing equipment, more and more people use multimedia conferencing as their communication tool. Videoconferencing sessions often require content to be presented with the video image. Business meetings, educational sessions, lectures, marketing presentations, professional meetings (such as design reviews), etc. typically require content presentation. Different types of content such as EXCEL® tables, POWERPOINT® presentation, slides, charts, drawings, etc. can be presented during a video conferencing session. (EXCEL and POWERPOINT are registered trademarks of Microsoft Inc.)

Usually the content is important for understanding the current discussion; therefore, the content is delivered to all the conferees. Some video conference sessions cover a large number of conferee's endpoints with different capabilities, over a large number of connection types having different quality. Further, some of the conferences are served by two or more Multipoint Control Units (MCUs) in cascading, etc.

An MCU is a conference controlling entity that is typically located in a node of a network or in a terminal that receives several channels from endpoints. The MCU processes audio and visual signals according to certain criteria and distributes the signals to a set of connected channels. Examples of MCUs include the MGC-100™ and the RMX 2000®, which are available from Polycom, Inc. (MGC-100 is trademark of Polycom, Inc. RMX 2000 is a registered trademark of Polycom, Inc.) A terminal, which may be referred to as an endpoint (EP), is an entity on the network, capable of providing real-time, two-way audio and/or video and/or content visual communication with another EP or with an MCU. A more thorough definition of an EP and an MCU can be found in the International Telecommunication Union (ITU) standards, such as but not limited to the H.120, H.324, and H.323 standards, which can be found at the ITU website: www.itu.int. Information about Session Initiation Protocol (SIP) can be found at the Internet Engineering Task Force (IETF) web site, www.ietf.org.

Usually, at a delivery EP, content can be compressed by an encoder other than the encoder that is used for the video image. In most cases, the frame rate used by the encoder to compress the content is low, for example, 1 to 10 frames per second. The compressed content can be sent from the delivery EP toward an MCU over a separate stream using a different channel than the EP video image. From the MCU, the content can be sent toward one or more receiving EPs as Video Switching (VSW) images over a separate stream other than the continuous presence (CP) video image of the conference. The parameters of the content encoder are negotiated to the highest common parameters. In some video conferences, the MCU may transcode the content that is sent toward one or more receiving EPs. Further, for some limited EPs that cannot handle the content as a separate video stream, the MCU may treat the content as a video image from an EP and may add it to a segment in the CP video image that is targeted toward the limited receiving EPs.

A user at a receiving EP that receives a CP video image can simultaneously observe several other participants in the conference. Each participant may be displayed in a segment of the layout, where each segment may be in the same size or a different size. The choice of the participants displayed and associated with the segments of the layout may vary among different conferees that participate in the same session. A user at a receiving EP that receives a VSW image can observe only one other participant in the conference. The one other participant may be displayed over the entire screen of the receiving EP.

The blend of a plurality of conferees, a plurality of endpoints qualities and a plurality of connections of different quality levels increases the frequency of the missing packets. Usually, the missing packets are followed by Intra requests for the content data. Most of the Intra requests are relevant to few endpoints or even to one endpoint but they affect all the endpoints, because the content is commonly distributed from a single encoder to a plurality of the endpoints.

Common video compression methods use Intra and Inter frames. An Intra frame is a video frame that is compressed relative to information that is contained only within the same frame and not relative to any other frame in the video sequence. An Inter frame is a video frame that was compressed relative to information that is contained within the same frame and relative to one or more other frames in the video sequence.

Compressing a video frame relative to information that is contained only within the same frame requires more computing time and delivers more data. Therefore, common encoders encode an Intra frame in low quality in sharpness and/or luminance, for example, and then improve the quality of each Inter frame. The result is a "breathing effect" in the sharpness and in the brightness, for example, of the content image. A plurality of Intra frames increases the "breathing effect."

In order to eliminate the number of Intra requests, some techniques filter Intra requests from problematic endpoints, other may use a content transcoder (decoder/encoder) in an MCU that is connected to the endpoint that delivers the content instead of just switching the content. However, such a solution moves the problem to the encoder at the MCU. None of those methods reduces the "breathing effect" of many Intra requests for content in large conferences.

SUMMARY OF INVENTION

The above-described deficiencies of distributing content to a plurality of conferees, do not intend to limit the scope of the inventive concepts of the present disclosure in any manner. The deficiencies are presented for illustration only. The disclosure is directed to a novel technique for delivering content in a videoconference among a plurality of conferees, wherein the mode of distributing the content from an MCU that is connected to the endpoint that delivers the content to receiving endpoints comprises two or more quality levels. The quality level can be adapted to the capabilities of the receiving endpoints (REPs) and the current quality of the connection that is used to deliver the content toward the REPs.

Following are few examples of quality levels that can be used for distributing content by some embodiments of the present description:

A first level of distributing can be referred as a VSW level. The VSW level can be used by an MCU for delivering content to high quality REPs that are currently connected to the MCU via high quality connections. In addition, the VSW level can be used also over the connection to another MCU for cascading the content to another group of REPs. As used herein, a high quality connection is defined as one with a missing packet rate below a first missing packet threshold. Various embodiments may configure a missing packet threshold for the VSW level as one missing packet per two minutes, a missing packet per minute, etc.

A second level can be referred as high-transcoded level (HTL). The HTL can be used by the MCU for delivering content to REPs that are connected to the MCU via high quality connections but need other compression parameters than the delivered content, for example a different compression standard, a different resolution, etc. The second level can be used also over a connection to another MCU for cascading the content to another group of conferees that have different compression parameters or to an MCU having a low quality connection. As used herein, a low quality connection is defined as one with a missing packet rate above a second missing packet threshold, the second missing packet threshold higher than the first missing packet threshold. Various embodiments may configure a missing packet threshold for the HTL level as one missing packet per minute, two missing packets per minute, four missing packets per minute, etc.

A third level can be referred as a good-transcoded level (GTL). The GTL can be used by the MCU for delivering content to REPs that are connected to the MCU via medium quality connections and need other compression parameters than the delivered content, for example a different compression standard, a different resolution, a different frame rate, a different bit rate, etc. As used herein, a medium quality connection is defined as one with a missing packet rate above a third missing packet threshold, the third missing packet threshold higher that the first missing packet threshold and lower than the second missing packet threshold. Various embodiments may configure a missing packet threshold for the GTL level in the range of 5 to missing packets per minutes, for example.

A fourth level can be referred as a legacy transcoded level (LTL). The LTL can be used by the MCU for delivering content to low quality REPs having low capabilities, such as REPs without interface capabilities for the content stream, or that do not have a second encoder, etc. In the LTL, the delivered content can be decoded and merged into the CP video image that is transmitted toward the low quality REP. The LTL can be used by REPs that cannot support shared content functionality.

Other example embodiments may use additional one or more quality levels in between the first and the fourth levels. Thus, the compression parameters of the content that is sent to a REP match the capacities of that REP and the current capacity of the connection to that REP. Consequently, there is no need to reduce the quality of the delivered content according to the highest negotiated common parameters. Fewer Intra requests will be sent from a REP having a low quality connection with the MCU. In addition, reducing the number of Intra requests also reduces the breathing effect on other REPs that do not need the requested Intra frame.

The number of modes of delivering the content in a video conferencing session and the allocated resources for handling the content can be set at the beginning of the session. The resources can comprise transcoding resources as well as communication resources. Later, during the session, the mode of delivery of the content to one or more REPs can be changed dynamically, adapting the delivery mode to changes in the conditions over the connection between one or more REPs and the relevant MCU.

These and other aspects of the description will be apparent in view of the attached figures and detailed description. The foregoing summary is not intended to summarize each potential embodiment or every aspect of the present description, and other features and advantages of the present description will become apparent upon reading the following detailed description of the embodiments with the accompanying drawings and appended claims.

Furthermore, although specific example embodiments are described in detail to illustrate the inventive concepts to a person skilled in the art, such embodiments are susceptible to various modifications and alternative forms. Accordingly, the figures and written description are not intended to limit the scope of the inventive concepts in any manner.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings, FIG. 1 schematically illustrates a simplified block diagram with relevant elements of an example of a video conference system.

DESCRIPTION OF EMBODIMENTS

Turning now to the figures, in which like numerals represent like elements throughout the several views, example embodiments of the present description are described. For convenience, only some elements of the same group may be labeled with numerals. The purpose of the drawings is to describe example embodiments and not for production. Therefore, features shown in the figures are chosen for convenience and clarity of presentation only. Moreover, the language used in this description has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments may implement the features and functionality described herein in software, firmware, or hardware as desired, including any combination of software, firmware, and hardware. In the following description, the words "unit," "element," "module" and "logical module" may be used interchangeably. Anything designated as a unit or module may be a standalone unit or a specialized or integrated module. A unit or a module may be modular or have modular aspects, allowing it to be easily removed and replaced with another similar unit or module. Each unit or module may be any one of, or any combination of, software, hardware, and/or firmware, ultimately resulting in one or more processors programmed to execute the functionality ascribed to the unit or module. Additionally, multiple modules of the same or different types may be implemented by a single processor. Software of a logical module may be embodied on a computer readable medium such as a read/write hard disc, CDROM, Flash memory, ROM, or other memory or storage, etc. In order to execute a certain task a software program may be loaded to an appropriate processor as needed. In the present description the terms task, method, and process are used interchangeably.

Figure 1:
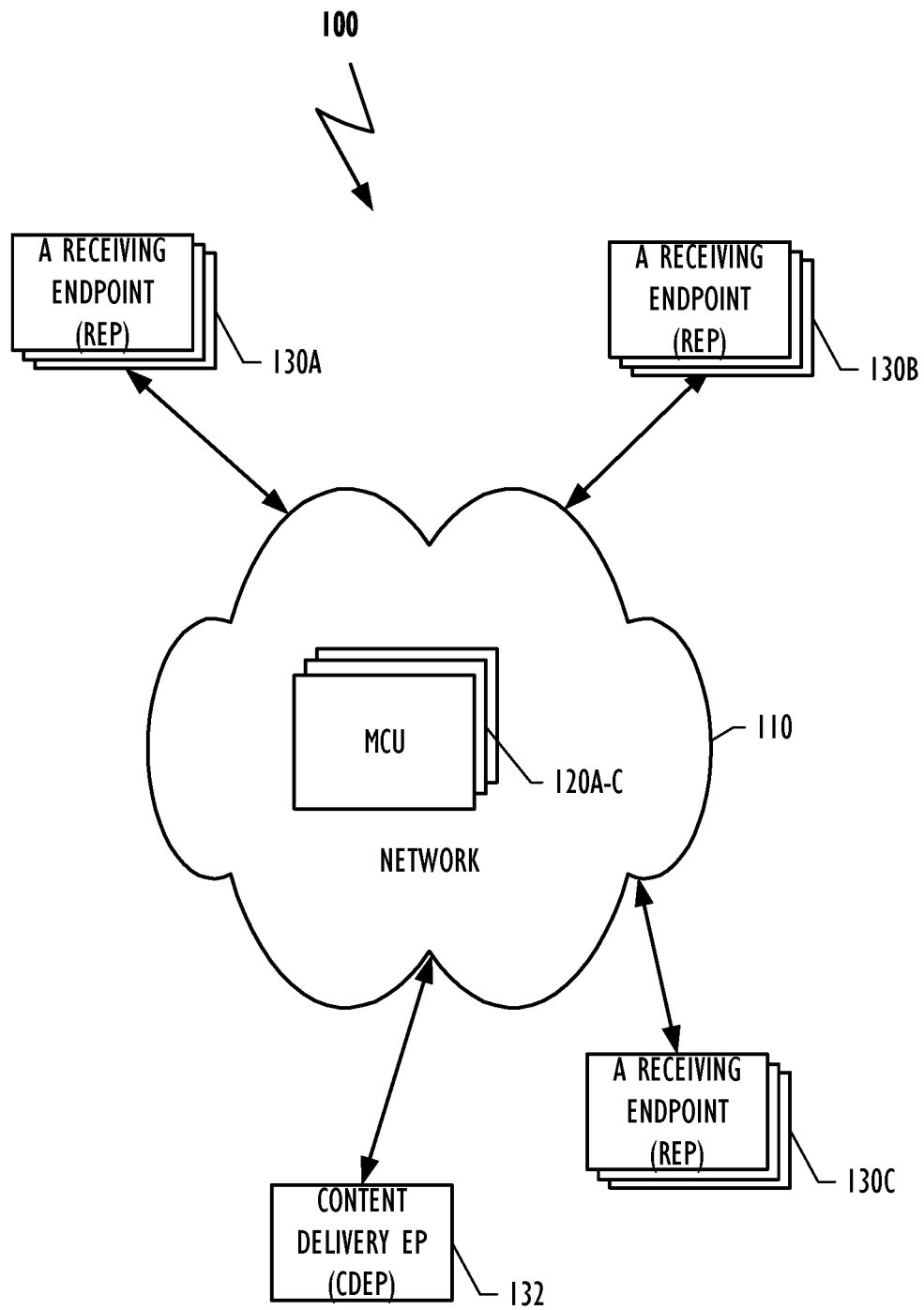

FIG. 1 illustrates a block diagram with relevant elements of a portion of a multimedia multipoint conferencing system 100 according to one embodiment. System 100 may include a network 110, connecting one or more MCUs 120a-c, and a plurality of receiving endpoints (REPs) 130a-c and a content delivery endpoint (CDEP) 132. In some embodiments in which network 110 includes a plurality of MCUs 120, a virtual MCU may be used for controlling the plurality of MCUs. More information on a virtual MCU may be found in U.S. Pat. No. 7,174,365, which is incorporated herein by reference in its entirety for all purposes. In some embodiments of system 100, one of the MCUs can perform the functionality of the virtual MCU and may control the rest of the MCUs. An endpoint 130 or 132 (which may be referred to as a terminal) is an entity on the network, capable of providing real-time, two-way content, audio, and/or visual communication with other endpoints 130 or with the MCU 120. An endpoint 130 or 132 may be implemented as a computer, a PDA (personal digital assistant), a cell phone, a TV set with a microphone and a camera, etc.

An MCU 120 may be used to manage a videoconference. An MCU is a conference controlling entity that may be located in a node of a network, in a terminal, or elsewhere. The MCU may receive and process several media channels from access ports according to certain criteria and distribute them to the connected channels via other ports. Examples of MCUs include the MGC-100 and RMX. 2000®, available from Polycom Inc. Some MCUs are composed of two logical units: a media controller (MC) and a media processor (MP). A more thorough definition of an endpoint and an MCU may be found in the International Telecommunication Union (ITU) standards, such as but not limited to the H.120, H.324, and H.323 standards. Additional information regarding the ITU standards may be found at the ITU website www.itu.int.

Network 110 may represent a single network or a combination of two or more networks. The network 110 may be any type of network, including a packet switched network, a circuit switched network, an Integrated Services Digital Network (ISDN) network, the Public Switched Telephone Network (PSTN), an Asynchronous Transfer Mode (ATM) network, the Internet, or an intranet. The multimedia communication over the network may be based on any communication protocol including H.120, H.324, H.323, Session Initiation Protocol (SIP), etc.

The information communicated between the EPs 130a-c, 132 and the MCU 120 may include signaling and control, content, audio information, or video images. Different combination of endpoints may participate in a conference. The endpoints may provide speech, content, video, signaling, control, or any combination of them.

An endpoint 130a-c or 132 may comprise a remote control (not shown in picture) that may act as an interface between a user of the endpoint and the MCU 120. The remote control may comprise a dialing keyboard (the keypad of a telephone, for example) that may use DTMF (Dual Tone Multi Frequency) signals, a far end camera control, control packets, etc. Furthermore, an endpoint may also comprise: one or more microphones (not shown in the drawing) to allow users at the endpoint to speak within the conference or contribute to the sounds and noises heard by other users, a camera to allow the endpoint to input live video data to the conference, one or more loudspeakers, and a display (screen).

The described portion of the system 100 comprises and describes only the most relevant elements. Other sections of a system 100 are not described. It will be appreciated by those skilled in the art that depending upon its configuration and the needs of the system, each system 100 may have other numbers of endpoints 130 or 132, networks 110, and MCUs 120. However, for clarity, one network 110 with a plurality of MCUs 120 is shown.

The MCUs 120a-c may be adapted to operate according to various embodiments of the present description to improve the experience of the conferees of a multimedia conference session while content is distributed toward a plurality of REPs 130 from a CDEP 132. An example of MCU 120 may be adapted to collect information about the level of each REP 130 and the current quality of the connection that carries the content toward that REP 130 and accordingly adapt the quality of the delivered content. More information about the operation of the MCU 120 and endpoints 130a-c, 132 according to different embodiments is disclosed below in conjunction to FIGS. 2 and 3.

Figure 2:
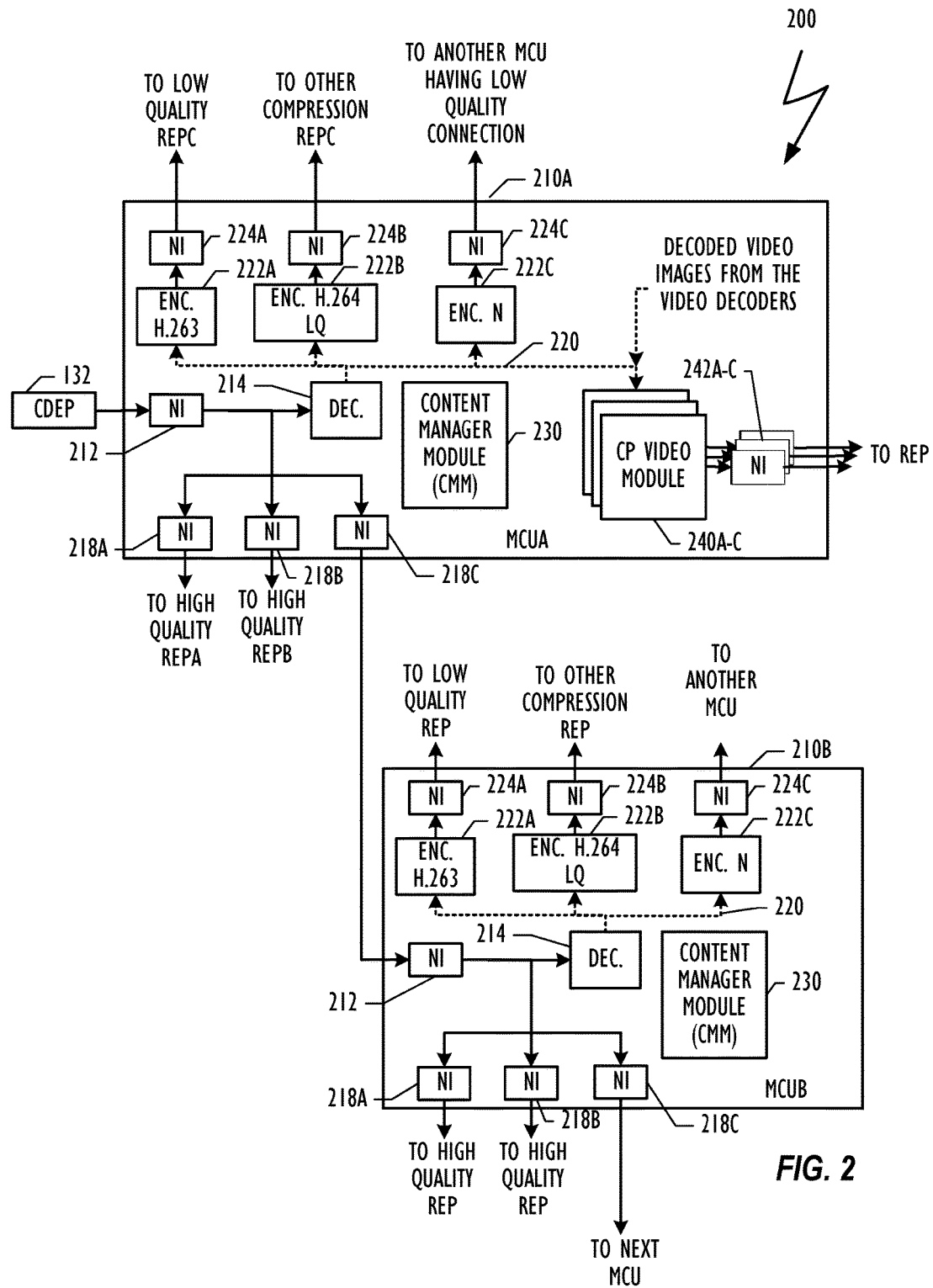
FIG. 2 schematically illustrates a simplified block diagram with relevant elements of an example content distribution system within a video conferencing system.

FIG. 2 illustrates a simplified block diagram with relevant elements of an example system 200 for distributing content delivered from a CDEP 132 (FIG. 1) via two or more MCUs 210a and 210b toward a plurality REPs 130 and one or more next MCUs. The REPs and the next MCU are not illustrated in FIG. 2. Furthermore, FIG. 2 illustrates only elements of MCU 210a-b that are related to the content delivery from CDEP 132. Elements that are not relevant to content delivery are not illustrated. For example, elements such as audio decoders, mixers, or encoders are not illustrated.

An example of an MCU 210a may comprise a network interface (NI) module 212. The NI 212 may receive signaling, control, and content communication from a CDEP 132 via networks 110 (FIG. 1). The content may be delivered as compressed video. The NI 212 may process the communication according to one or more communication standards including H.321, H.323, H.324, SIP, etc. The processed communication can carry the content as frames of compressed video. The compressed content may be delivered via a local bus to a video decoder 214 and to one or more NI modules 218a-c. The local bus can be any desired type of bus, such as a Time Division Multiplexing (TDM) bus or Peripheral Component Interconnect (PCI) bus, etc. The compression of the content can be according to the capabilities of the CDEP 132. More information concerning the communication between endpoints and the MCU over the network 110 and information describing signaling, control, compression, and setting a video call may be found in the ITU standards H.120, H.321, H.323, H.261, H.263, H.264, G.711, G.722, and MPEG etc. or from the IETF Network Working Group website (information about SIP).

Each one of the NIs 218a and 218b can communicate with one or more high quality REPs 130 via a high quality connection. NI 218c can communicate with a next MCU 210b via a high quality connection. NIs 218a-c may obtain compressed frames of content delivered from CDEP 132 via an NI 212 and the local bus, process the obtained frames according to a relevant communication protocol such as H.321, H.323, H.324, or SIP, and may send packets carrying high quality compressed content toward the connected one or more high quality REPs 130 or another MCU 210b.

Decoder 214 obtains the stream of compressed frames of content and decodes it into content as a stream of decoded video frames. The decoding is performed according to the compression standard used by the CDEP 132. The decoded frames can be delivered over a common interface 220 to a plurality of encoders 222a-c and a plurality of CP video modules 240a-c. The common interface 220 may carry decoded video obtained from a plurality of video decoders (not shown in the figures); each video decoder is associated with an endpoint and decodes its received video image. The common interface 220 can be a time-division multiplexing (TDM) bus, peripheral component interconnection (PCI) bus, or a shared memory, for example. An example of encoder 222a can be associated with one or more REPs 130 that use other compression standards than the CDEP 132. Encoder 222a can compress the decoded content according to H.263 while the CDEP uses compression standard H.264, for example.

Encoder 222b can compress the decoded frames of content according to compression standard H.264, the same standard as the one that is used by CDEP 132, where the connection to the relevant one or more REPs 130 suffers from bad conditions. Therefore, encoder 222b may use the same compression standard but with lower quality, lower bit rate, or lower frame rate than the one that is used by the encoder of the CDEP 132, for example. Encoder 222c may be associated with another cascaded MCU 120. However, the connection between the MCU 210a and the other MCU may be a bad connection with many lost packets. Therefore, encoder 222c may use the same compression standard as CDEP 132 but with a lower quality, lower bit rate, or lower frame rate than the one that is used by the encoder of the CDEP 132, for example.

Each one of the encoders 222a-c is connected to the network 110 via an NI 224a-c (respectively). NIs 224a-c operate in a similar way to NIs 218a-c, which are described above and will not be further described.

In addition, MCU 210a may further comprise a plurality of CP video modules 240a-c. Each CP video module 240 may be associated with one or more REPs 130 that cannot receive the content over any channel other than the video channel or use additional decoders to decode the content in parallel with decoding the CP video image. In order to overcome the limitation of such a REP 130, each CP video module is configured to obtain the decoded video presentation of the content from the common interface 220, as well as decoded video images from the decoders (not shown in the drawings) of one or more endpoints that were selected to be presented in its CP video image. The obtained decoded video of the content and each video image can be scaled to the size of a segment in a CP layout that is used for composing a CP video image for that REP 130. Then, the scaled images can be composed with the scaled content into the CP video frame. The CP video frame can be encoded according to the capabilities of the REP 130 and the current condition of the connection that associates the REP 130 and the MCU 210. Each one of CP video modules 240a-c is connected to the network 110 via an NI 242a-c (respectively). NIs 242a-c operate in a similar way to NIs 218a-c, which are described above and will not be further described.

Video decoders, video encoders, and CP video modules are well known to a person having ordinary skill in the art and will not be further described. A reader who wishes to learn more about those components is invited to read compression standards such as but not limited to H.261, H.263, H.264, etc. or some U.S. patents such as but not limited to U.S. Pat. Nos. 6,300,973, 7,535,485, and many other documents.

The content section of MCU 210a can be controlled by a Content Manager Module (CMM) 230. CMM 230 can be a section of a controller, which is not illustrated, of the entire MCU or a section of an MC in the case of a distributed MCU architecture. At the commencement of adding content to a video conferencing session, an embodiment of CMM 230 may be allocated and be initiated by a controller of the MCU 210a that is connected to an endpoint that is willing to deliver the content, the CDEP 132. Upon its initiation, the CMM 230 may collect information regarding the capabilities of the CDEP 132 and each one of the REPs 130 as well as other MCUs that are involved in that session. The CMM 230 may further collect information about the quality and the load over the connections to each of the REPs 130 and the other MCUs.

Based on the collected information, CMM 230 may allocate the appropriate resources for distributing the content from the CDEP 132 toward the plurality of REPs 130 and the cascaded MCUs. For each one of the high quality REPs that can receive the content over a separate channel and having a high quality connection, an NI 218 can be allocated. For a REP that has bad connection, an encoder 222a and an NI 224a can be allocated. In some embodiments, the encoder 222a can serve a plurality of REPs that have a bad connection. A NI such as 224a can be allocated for each of those REPs. For a REP 130 that requires different compression parameters, an encoder 222b and an NI 224b can be allocated. In some embodiments, the encoder 222b can serve a plurality of REP that has required the same compression parameters. A NI such as 224b can be allocated for each of those REPs. For a cascading MCU that is connected via a high quality connection, an NI 218c can be allocated. For an MCU that is connected via low quality connection an encoder 222c and an NI 224c can be allocated.

MCU 210a is further connected to low quality REPs 130 that cannot receive the content over a separate channel. Therefore, CMM 230 may instruct a CP video module 240 and an NI 242 that has been already allocated for handling the CP video image for that REP 130 to obtain the decoded content from the common interface 220 instead of the decoded video image of one of the presented endpoints.

In parallel to the setup process of MCU 210a, CMM 230 of MCU 210a may initiate a content session with the CMM 230 of MCU 210b, causing it to allocate similar resources for delivering the content received from CDEP 132 via NIs 212 and 218c of MCU 210a and NI 212 of MCU 210b. CMM 230 of MCU 210b performs a similar process as CMM 230 of MCU 210a. However, none of the REPs 130 that are connected to MCU 210b needs to get the content as a segment in its CP video image. Therefore, the CP video modules 240a-c and NI 242a-c are not allocated and thus are not illustrated in MCU 210b.

At this point of time, all the relevant resources for handling the content distribution have been allocated and the CMM 230 may initiate the content delivery. During the content delivery session, the CMM 230 may collect indication from each one of the NIs that is associated with a REP in order to monitor the current condition over the connection that carries the content toward that REP 130. Upon determining that a change in the quality has occurred, CMM 230 may change the allocated resources accordingly. In some embodiments of an MCU 210a, during the setup of the conference session each endpoint may report on its capabilities as well as the capabilities and the available bandwidth over the relevant one or more connections. Further, in some embodiments each NI may be configured to send an indication on the quality of its associated connection to CMM 230. The indication may indicate an Intra request that was obtained from an associated REP. Another indication can be an indication of a missing packet, etc. From time to time, the CMM 230 can determine whether the number of received Intra request increases over a certain threshold per a time unit, or alternatively decreases from a certain frequent value, in order to determine to change the quality level in both directions, decrease/increase respectively. MCU 210b has similar modules as MCU 210a and therefore it will not be further described.

In some embodiments a content session can be initiated on the assumption that all REPs are high quality REPs having high quality connections. In such an embodiment, a session can be commenced by allocating an NI 218a-c to each of the REP. During the session, based on the following Intra request, for example, a decoder and one or more encoders can be allocated per REP that needs lower quality. More information on the operation of MCU 210a is described below in conjunction with FIG. 3.

Figure 3:
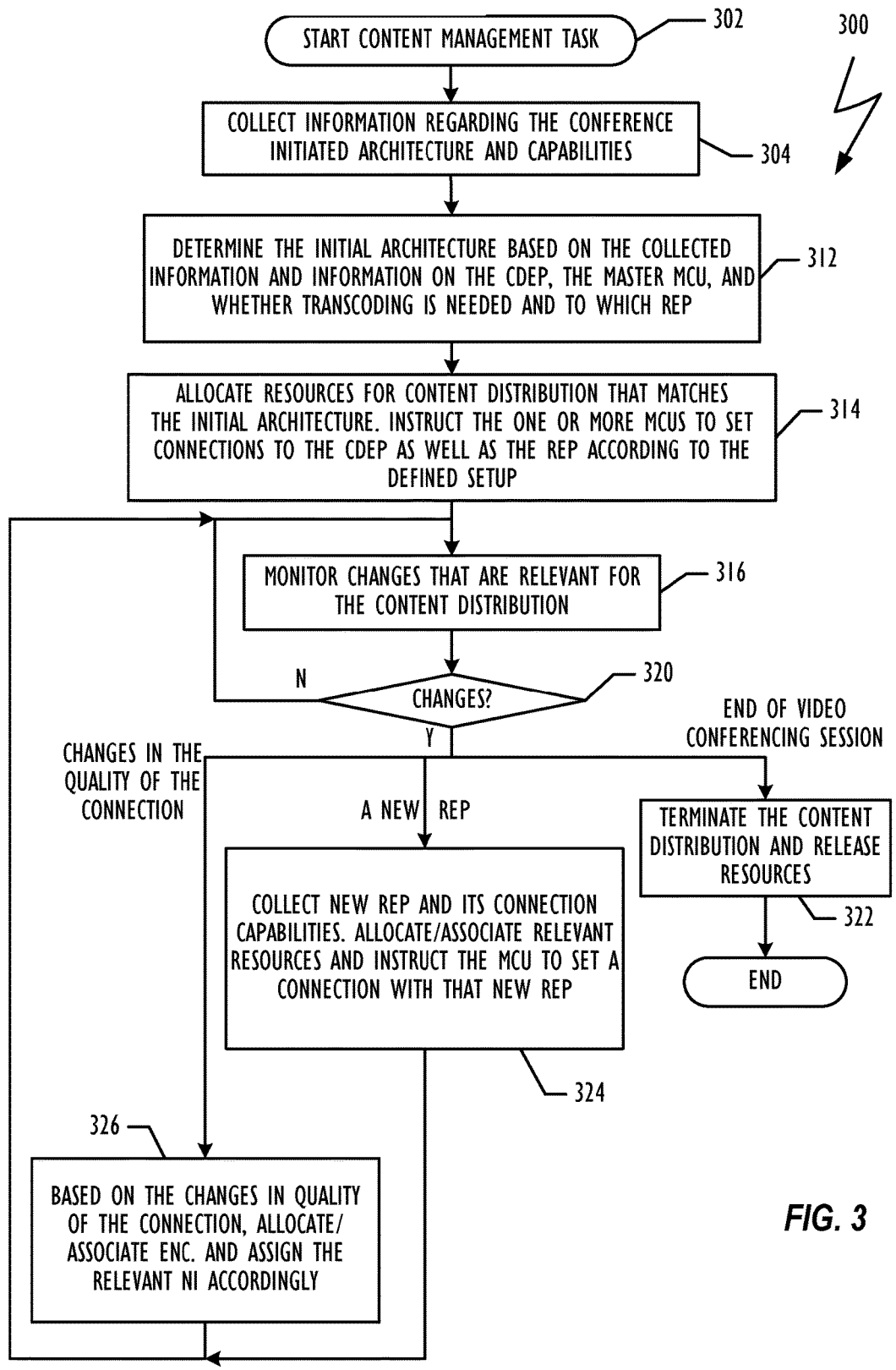
FIG. 3 is a flowchart illustrating relevant actions of a method for controlling content distribution.

FIG. 3 is illustrates a flowchart with relevant actions of an example of a method 300 for managing content distribution in a multipoint multimedia conferencing session. Method 300 can be implemented by CMM 230. Method 300 can be initiated in block 302 when a controller of MCU 210 may get an indication that a CDEP 132 is willing to associate content with a video conferencing session. After the initiation, method 300 may collect in block 304 information on the capabilities of the CDEP 132, each REP 130 and each cascading MCU 210b. In addition, CMM 230 may collect information about the quality of each of the connections, which will carry the content from the MCU 210 and each of the REPs 132 as well as cascading one or more MCUs. The quality parameter can comprise one or more of the allocated bandwidth for the current session, the latency, and the jitter that can be measured, etc.

Based on the collected information, CMM 230 may define in block 312 the initial architecture that is required for distributing the content. For a high quality REP 130 having a high quality connection, an NI 218a-c is needed. For a low quality REP 130 that cannot receive the content over a separate channel, the content can be decoded and transferred to a CP video module 240 to be embedded as a segment in the CP video image that is targeted toward that REP. For a high quality REP 130 having a bad connection, an encoder 222b and an NI 224b can be needed, etc.

According to the defined initial architecture, method 300 can allocate in block 314 the required resources and set the connections that match the initial architecture. After allocating the resources and setting the connections, method 300 can instruct the CDEP 132 to start sending the content as compressed video starting with an Intra frame.

In other embodiments, a content session can be initiated in the assumption that all REPs are high quality REPs having via high quality connection. In such an embodiment, a session can be commenced by allocating an NI 218a-c to each of the REP. During the session, based on the following Intra request a decoder and one or more encoders can be allocated per REP that needs lower quality.

After the initiation of the content delivery, method 300 may monitor in block 316 changes in the content distribution, for adapting the content delivery resources to the current condition over the connection to the REP. Monitoring the changes can be done by instructing each of the NIs 218a-c, 224a-c, and 242a-c to report when an Intra frame request is received from its associated REP 130, for example. In alternate embodiments, the NIs can be configured to report on missing packets. In other embodiments, the NI can be configured to report on both instances of missing packets and Intra requests, for example. Changes can also be reported from the controller of the conferencing session, for example, when a new conferee joins the session or a conferee leaves the session, when the session is terminated, etc.

At block 320 a decision is made whether a change has been detected. If not, method 300 returns to block 316 and continues monitoring the content distribution. If in block 320 a change occurred, then based on the type of the change the CMM 230 may proceed. If the video session or the content part is terminated, then at block 322 the content distribution resources can be released and method 300 can be terminated. If a new REP 130 joined the conference, then at block 324 CMM 230 may collect information on the capability of the new REP and the quality of the connection toward it. Then the appropriate resources for carrying the content can be allocated or associated in block 324. If the new REP is a low quality endpoint or has a low quality connection, then the new REP can be connected via an encoder 222a, 222b or a CP video module 240a-c. In such a case, the encoder can initiate sending the compressed content. If the new REP is a high quality endpoint having high quality connection, then just an NI 218a,b can be allocated. In that case, the CMM 230 may request the CDEP 132 to send an Intra frame in order to enable proper decoding at the new REP and method 300 returns to block 316 and continues monitoring changes. In some embodiments, the new REP requests the Intra frame.

In case that a change occurred is in the current quality of the connection to a certain REP, then CMM 230 may determine in block 326 whether the change is due to a reduction in the connection quality or frequent Intra requests, for example. In such a case, CMM 230 may determine that transcoding of the content into lower quality compression parameters is needed. In such a case, an encoder 222b can be allocated or associated between the common interface 220 and the NI that was already associated with that REP. The encoder can collect the decoded content from the common interface 220 and can encode it with lower bit rate or lower frame rate, for example. If the change is a positive one, the connection is improved, and the requests for Intra frame is less frequent, then the encoder 222b can be released, later the CDEP can be instructed to send an Intra frame. In some embodiments of method 300, changes that require requesting an Intra frame from the relevant encoder may be postponed until an Intra frame is needed by a few REPs. After handling the changes in the quality of the connection, method 300 may return to block 316 for continue monitoring the changes in the content distribution.

It will be appreciated that the above-described apparatus, systems, and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combinations of features and elements that have been described in association with different embodiments throughout the disclosure. The scope of the invention is limited only by the following claims and equivalents thereof.

While certain embodiments have been described in details and shown in the accompanying drawings, it is to be understood that such embodiments are merely illustrative of and not devised without departing from the basic scope thereof, which is determined by the claims that follow. In the appended claims, the terms "including" and "in which" are used as the plain-English equivalents of the respective terms "comprising" and "wherein."

What is claimed is:

1. A method for distributing content received from content delivery endpoints in a multimedia conference, comprising:
    associating with a first endpoint of a plurality of endpoints a first set of content delivery resources based on capabilities of the first endpoint and a first content connection quality;
    assigning a first quality level to the first endpoint responsive to whether the first endpoint can decode content from a content delivery endpoint and whether the first content connection quality identifies a high quality connection; and
    transferring the content toward the first endpoint via the first set of content delivery resources,
    wherein the content comprises one or more data files to be presented during the multimedia conference, and
    wherein the first set of content delivery resources differs from at least one other set of content delivery resources associated with another endpoint of the plurality of endpoints.

2. The method of claim 1, wherein the first set of content delivery resources each comprise one or more of a network interface, a video decoder, a video encoder and a continuous presence video module.

3. The method of claim 1, further comprising:
    exchanging capability information with the first endpoint as part of establishing a first content connection.

4. The method of claim 1, further comprising:
    allocating a second set of content delivery resources, different from the first set of content delivery resources, for distributing the content toward a second endpoint;
    transcoding the content into a second content;
    assigning a second quality level to the second endpoint; and
    associating a second network interface with the second endpoint; and
    transferring the second content via the second network interface.

5. The method of claim 1, wherein associating the first set of content delivery resources to the first endpoint comprises associating a network interface with the first endpoint for transferring the content as received from the content delivery endpoint.

6. The method of claim 1, wherein the first endpoint is assigned a second quality level responsive to the first endpoint requiring different compression parameters than compression parameters used by the content delivery endpoint and the first content connection quality identifies a high quality connection.

7. The method of claim 1, wherein the first endpoint is associated with a third quality level responsive to the first endpoint requiring different compression parameters than compression parameters used by the content delivery endpoint and the first content connection quality identifies a medium quality connection.

8. The method of claim 1, wherein the first endpoint is associated with a fourth quality level if the first endpoint cannot process the content as a content stream.

9. A programmable device comprising:
    a first network interface module configured to receive a first content from a content transmitting endpoint;
    a decoder, configured to decode the first content;
    an encoder configured to compress the decoded first content into a second content; and
    a second network interface module configured to transmit one of the first content or the second content toward a first endpoint; and
    a content manager module operable to:
        identify capabilities of the first endpoint;
        identify a quality of a connection associated with the first endpoint; and
        instruct the second network interface module whether to transmit the first content or the second content.

10. The programmable device of claim 9, wherein the content manager module is operable to identify the quality of the connection associated with the first endpoint by monitoring how many Intra requests are received from the first endpoint.

11. The programmable device of claim 9, wherein the content manager module is configured to identify the quality of the connection associated with the first endpoint by monitoring missing packets over the connection with the first endpoint.

12. The programmable device of claim 9, wherein the capabilities of the first endpoint comprise compression parameters used by the first endpoint.

13. One or more non-transitory machine readable media, on which are stored instructions, comprising instructions that when executed cause one or more processors of a multipoint control unit to:
    associate with a first endpoint of a plurality of endpoints a first set of content delivery resources based on capabilities of the first endpoint and a first content connection quality;
    assign a first quality level to the first endpoint responsive to whether the first endpoint can decode content from a content delivery endpoint and whether the first content connection quality identifies a high quality connection; and
    transfer the content toward the first endpoint via the first set of content delivery resources,
    wherein the content comprises one or more data files to be presented during a multimedia conference, and
    wherein the first set of content delivery resources differs from at least one other set of content delivery resources associated with another endpoint of the plurality of endpoints.

14. The machine readable media of claim 13, wherein the first set of content delivery resources each comprise one or more of a network interface, a video decoder, a video encoder and a continuous presence video module.

15. The machine readable media of claim 13, wherein the instructions further comprise instructions that when executed cause at least some of the one or more processors of the multipoint control unit to:
    exchange capability information with the first endpoint as part of establishing a first content connection.

16. The machine readable media of claim 13, further comprising:
- allocate a second set of content delivery resources, different from the first set of content delivery resources, for distributing the content toward a second endpoint;
- transcode the content into a second content;
- assign a second quality level to the second endpoint; and
- associate a second network interface with the second endpoint; and
- transfer the second content via the second network interface.

17. The machine readable media of claim 13, wherein associating the first set of content delivery resources to the first endpoint comprises associating a network interface with the first endpoint for transferring the content compressed as received from the content delivery endpoint.

18. The machine readable media of claim 13, wherein the first endpoint is assigned a second quality level responsive to the first endpoint requiring different compression parameters than compression parameters used by the content delivery endpoint and the first content connection quality identifies a high quality connection.

19. The machine readable media of claim 13, wherein the first endpoint is associated with a third quality level responsive to the first endpoint requiring different compression parameters than compression parameters used by the content delivery endpoint and the first content connection quality identifies a medium quality connection.

20. The machine readable media of claim 13, wherein the first endpoint is associated with a fourth quality level if the first endpoint cannot process the content as a content stream.

* * * * *